United States Patent
Gao et al.

(10) Patent No.: US 12,091,334 B2
(45) Date of Patent: Sep. 17, 2024

(54) ELECTROLYTIC ASSEMBLY AND LAUNDRY TREATMENT APPARATUS

(71) Applicant: WUXI LITTLE SWAN ELECTRIC CO., LTD., Wuxi (CN)

(72) Inventors: Jiuxing Gao, Wuxi (CN); Youming Tu, Wuxi (CN); Qingbo Yang, Wuxi (CN); Ming Xiong, Wuxi (CN); Cunling Zhou, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 446 days.

(21) Appl. No.: 17/613,077

(22) PCT Filed: Dec. 30, 2019

(86) PCT No.: PCT/CN2019/130109
§ 371 (c)(1),
(2) Date: Nov. 21, 2021

(87) PCT Pub. No.: WO2021/022780
PCT Pub. Date: Feb. 11, 2021

(65) Prior Publication Data
US 2022/0315454 A1    Oct. 6, 2022

(30) Foreign Application Priority Data

Aug. 6, 2019  (CN) .......................... 201910722785.6
Aug. 6, 2019  (CN) .......................... 201910722803.0
(Continued)

(51) Int. Cl.
*C02F 1/461*  (2023.01)
*D06F 35/00*  (2006.01)
(Continued)

(52) U.S. Cl.
CPC ........ *C02F 1/4618* (2013.01); *C02F 1/46109* (2013.01); *D06F 35/003* (2013.01);
(Continued)

(58) Field of Classification Search
CPC ...... D06F 35/003; D06F 35/004; D06F 39/04; A47L 15/4285; A47L 15/4238;
(Continued)

(56) References Cited

U.S. PATENT DOCUMENTS 4,110,191 A    8/1978 Specht et al.
4,305,806 A   12/1981 Holca
(Continued)

FOREIGN PATENT DOCUMENTS

CA    2307071 A1    2/2001
CH     420074 A     9/1966
(Continued)

OTHER PUBLICATIONS

Machine Translation of Balestriero et al., EP 1530041 A1, May 2005. (Year: 2005).*
(Continued)

*Primary Examiner* — David G Cormier

(57) ABSTRACT

An electrolytic assembly and a laundry treatment apparatus. An electrolytic assembly includes an electrolytic device, a heating member, and a mounting device. The electrolytic device includes an electrode. The electrolytic device and/or heating member is connected to the mounting device. The heating member and the electrode are located on the same side of the mounting device. The electrolytic assembly can produce a hydroxyl radical having a strong oxidization activity by electrolyzing water by means of the electrolytic device to perform disinfection and sterilization, and can further heat a liquid to a required temperature by means of the heating member. The integration of the heating member (Continued)

and the electrolytic device can facilitate the arrangement of the structures of the heating member and the electrolytic device more compact and facilitate overall assembly/disassembly.

11 Claims, 10 Drawing Sheets

(30) Foreign Application Priority Data

Dec. 3, 2019 (CN) .......................... 201911222522.5
Dec. 3, 2019 (CN) .......................... 201922138237.7

(51) Int. Cl.
*D06F 39/04* (2006.01)
*C02F 101/30* (2006.01)

(52) U.S. Cl.
CPC .... *D06F 39/04* (2013.01); *C02F 2001/46185* (2013.01); *C02F 2101/308* (2013.01); *C02F 2201/46155* (2013.01); *C02F 2209/02* (2013.01); *C02F 2303/04* (2013.01); *C02F 2307/12* (2013.01)

(58) Field of Classification Search
CPC .... C02F 1/4618; C02F 1/46109; C02F 1/467; C02F 2201/461; C02F 2201/46105; C02F 2201/46155; C02F 2201/46109; C02F 2201/46152; C02F 2001/46185; C02F 2209/02; C02F 2303/04; C02F 2307/12
See application file for complete search history.

(56) References Cited

U.S. PATENT DOCUMENTS

| | | | |
|---|---|---|---|
| 4,622,113 | A | 11/1986 | Satoh et al. |
| 5,002,642 | A | 3/1991 | Kaneko et al. |
| 2004/0256247 | A1 | 12/2004 | Carson et al. |
| 2005/0279141 | A1* | 12/2005 | Kim ........................ D06F 39/04 68/12.22 |
| 2006/0191496 | A1 | 8/2006 | Muenzner et al. |
| 2010/0181208 | A1 | 7/2010 | Denison et al. |
| 2011/0177375 | A1 | 7/2011 | Pfanner et al. |
| 2016/0002802 | A1 | 1/2016 | Grant et al. |

FOREIGN PATENT DOCUMENTS

| | | |
|---|---|---|
| CN | 1133619 A | 10/1996 |
| CN | 1180907 A | 5/1998 |
| CN | 1352704 A | 6/2002 |
| CN | 1097831 C | 1/2003 |
| CN | 1537991 A | 10/2004 |
| CN | 2693802 Y | 4/2005 |
| CN | 2712972 Y | 7/2005 |
| CN | 1770352 A | 5/2006 |
| CN | 1828162 A | 9/2006 |
| CN | 1944765 A | 4/2007 |
| CN | 101320627 A | 12/2008 |
| CN | 101579197 A | 11/2009 |
| CN | 101967740 A | 2/2011 |
| CN | 202202162 U | 4/2012 |
| CN | 102786119 A | 11/2012 |
| CN | 103177880 A | 6/2013 |
| CN | 103903862 A | 7/2014 |
| CN | 203834220 U | 9/2014 |
| CN | 104109892 A | 10/2014 |
| CN | 105865035 A | 8/2016 |
| CN | 205617512 U | 10/2016 |
| CN | 107240700 A | 10/2017 |
| CN | 107326610 A | 11/2017 |
| CN | 108589181 A | 9/2018 |
| CN | 208379020 U | 1/2019 |
| CN | 109817463 A | 5/2019 |
| CN | 211896182 U | 11/2020 |
| DE | 102005010512 A1 | 9/2006 |
| EP | 1530041 A1 | 5/2005 |
| FR | 2909370 A1 | 6/2008 |
| JP | H10277554 A | 10/1998 |
| JP | 2000107090 A | 4/2000 |
| JP | 2001286698 A | 10/2001 |
| JP | 2003260290 A | 9/2003 |
| JP | 2004298732 A | 10/2004 |
| JP | 2004298754 A | 10/2004 |
| JP | 2005161146 A | 6/2005 |
| KR | 20110042868 A | 4/2011 |
| KR | 20140110668 A | 9/2014 |
| TW | M248799 U | 11/2004 |
| TW | I597389 B | 9/2017 |

OTHER PUBLICATIONS

First Office Action issued on Jun. 23, 2022 regarding the CN counterpart 201911222699.5.
Supplementary European Search Report issued on Nov. 2, 2022 regarding the EP counterpart 19940515.0.
International Search Report of PCT No. PCT/CN2019/130109.
Notice of Allowance mailed Mar. 10, 2023 of CN Application No. 202111271114.6.
First OA mailed Jan. 17, 2023 of JP Application No. 2022-506505.
First Office Action mailed Oct. 20, 2022 of CN Application No. 202110945237.7.
First Office Action mailed Oct. 19, 2022 of CN Application No. 202111013337.2.
First OA received in CN Application No. 201911222522.5; mailed Mar. 12, 2024.

* cited by examiner

ELECTROLYTIC ASSEMBLY AND LAUNDRY TREATMENT APPARATUS

CROSS-REFERENCES TO RELATED APPLICATIONS

The present disclosure is a national phase application of International Application No. PCT/CN2019/130109, filed on Dec. 30, 2019, which claims priorities to Chinese patent application No. 201910722803.0 filed on Aug. 6, 2019, Chinese patent application No. 201910722785.6 filed on Aug. 6, 2019, Chinese patent application No. 201911222522.5 filed on Dec. 3, 2019 and Chinese patent application No. 201922138237.7 filed on Dec. 3, 2019, the entire contents of which are hereby incorporated by reference in their entireties.

FIELD

The disclosure relates to the field of electrolytic sterilization, and in particular to an electrolytic assembly and a laundry treatment apparatus.

BACKGROUND

Due to an extremely high oxidation potential (2.80 eV), a hydroxyl free radical (.OH) has strong oxidation capacity, and may generate a rapid chain reaction with most of organic pollutants and oxidize harmful substances into $CO_2$, $H_2O$ or mineral salt without selectivity, and may not induce secondary pollution. In a related art, water is electrolyzed by using an electrode in a washing machine, and .OH may be generated to perform sterilization.

SUMMARY

In view of the above, embodiments of the disclosure are intended to provide an electrolytic assembly with a heating function and a laundry treatment apparatus.

The embodiments of the disclosure provides an electrolytic assembly including: an electrolytic device, including an electrode; a heating member; and a mounting device, to which at least one of the electrolytic device or the heating member is connected, and the heating member and the electrode are located on the same side of the mounting device.

In some implementations, the electrolytic device includes a conductive connector in conductive connection with the electrode, the mounting device has formed therein a first mounting hole penetrating it, and the conductive connector is hermetically arranged in the first mounting hole in a penetrating manner.

In some implementations, an end of the heating member is hermetically arranged in a second mounting hole in a penetrating manner.

In some implementations, the electrolytic assembly includes a first fastener connecting the electrode to the heating member.

In some implementations, the heating member includes a first rod and a second rod, and the electrode is located between the first rod and the second rod.

In some implementations, the electrolytic assembly includes a first insulator located between the first rod and the second rod and mounted to sleeve the electrode, and a first fastener surrounding outer surfaces of the first rod, the second rod and the first insulator.

In some implementations, at least one of a top surface or a bottom surface of the first insulator is formed with a first groove in which a part of the first fastener is located.

In some implementations, the electrode includes at least one layer of electrode units.

In some implementations, each of the electrode units includes a cathode sub-member and an anode sub-member which are arranged at an interval, the cathode sub-member includes a first support and at least one first comb-shaped tooth extending from the first support along a direction away from the first support; and the anode sub-member includes a second support and at least one second comb-shaped tooth extending from the second support along a direction away from the second support; and the first comb-shaped tooth and the second comb-shaped tooth are alternately arranged at an interval.

In some implementations, the first comb-shaped tooth includes a first sub-tooth and a second sub-tooth which are arranged at an interval along a thickness direction of the cathode sub-member; and the second comb-shaped tooth includes a third sub-tooth and a fourth sub-tooth which are arranged at an interval along a thickness direction of the anode sub-member.

In some implementations, the electrode units have multiple layers; and the electrolytic assembly includes separation pads which are arranged between adjacent two of the electrode units.

In some implementations, each of the separation pads has formed therein first through holes penetrating the separation pad along a thickness direction thereof.

In some implementations, each of the electrode units includes a cathode sub-member and an anode sub-member which are arranged at an interval, and a protrusion is formed on a surface of each of the separation pads, and extends into a space between the cathode sub-member and the anode sub-member on the same side of the separation pad.

In some implementations, the electrolytic assembly includes second insulators, each of which at least a part is clamped between a cathode and an anode forming the electrode.

In some implementations, the cathode and the anode are arranged in a stack, each of the second insulators includes a base clamped between the cathode and the anode and columns protruding out of a surface of the base, the anode is provided with through holes, and each of the columns is arranged in a respective one of the through holes in a penetrating manner.

In some implementations, the electrolytic assembly includes buckles and second fasteners, through which the heating member and the electrode are fixedly connected.

In some implementations, each of the buckles includes a connecting section located between the first rod and the second rod and snapping sections located at two opposite ends of the connecting section, one of the snapping sections is snapped on the first rod, and the other of the snapping sections is snapped on the second rod.

In some implementations, multiple buckles are present, and arranged at intervals along a length direction of at least one of the first rod or the second rod.

In some implementations, the buckles are arranged on two opposite sides along a stacking direction of the cathode and the anode, the cathode and the anode are clamped between two of the buckles, and the cathode, the anode and the two of the buckles are fixedly connected through the second fasteners.

In some implementations, an end face of each of the columns protrudes out of a surface of the anode, and abuts against the connecting section and an interval space is formed between the connecting section and the anode, a first connecting hole penetrating each of the columns and the base is formed in the second insulator, second connecting holes are formed in the connecting section, third connecting holes are formed in the cathode, and each of the second fasteners is arranged in a respective one of the first connecting holes, the second connecting holes and the third connecting holes in a penetrating manner.

In some implementations, the electrolytic assembly includes insulated limiting members clamped in the interval space.

In some implementations, at least one second through hole is formed in each of the insulated limiting members, and each of the columns is arranged in a respective one of the second through holes in a penetrating manner.

In some implementations, multiple columns are present, and arranged at intervals along an extending direction of the connecting section, each of the insulated limiting members has formed therein a second through hole in which a respective one of the columns is arranged in a penetrating manner, one of the insulated limiting members is arranged between two of the columns, and formed with open notches at two opposite ends thereof along the extending direction of the connecting section, and each of the open notches is matched with a respective one of the columns.

In some implementations, each of the insulated limiting members is provided with a second groove extending along an extending direction of the connecting section, and a part of the connecting section is located in the second groove.

In some implementations, the anode is provided with second through holes penetrating the anode along a thickness direction thereof; and/or, the cathode is provided with third through holes penetrating the cathode along a thickness direction thereof.

In some implementations, the anode is formed in a net-shaped structure, and the cathode is formed in a net-shaped structure.

In some implementations, the electrolytic assembly includes a temperature controller, the mounting device has formed therein a third mounting hole penetrating it, the temperature controller is hermetically arranged in the third mounting hole in a penetrating manner, and an end, configured to measure temperature, of the temperature controller is located on a side, facing the electrode, of the mounting device.

In some implementations, the mounting device includes a connector and a main body including a first mounting plate, a second mounting plate and an elastic body clamped between the first mounting plate and the second mounting plate; the mounting device has formed therein a connecting hole in which the connector is hermetically arranged in a penetrating manner; and the first mounting hole, the second mounting hole and the connecting hole penetrate the first mounting plate, the elastic body and the second mounting plate respectively.

Some of the embodiments of the disclosure provides a laundry treatment apparatus including: an inner cylinder; an outer cylinder, in which the inner cylinder is arranged in a rotatable manner, and having formed therein an avoiding opening; and the electrolytic assembly in any of the above descriptions, having the electrode and the heating member arranged between the outer cylinder and the inner cylinder, and having the mounting device sealing the avoiding opening.

Furthermore, the laundry treatment apparatus includes a mounting support connected to an inner side of the outer cylinder and supporting the heating member.

The electrolytic assembly according to the embodiments of the disclosure may generate .OH having a strong oxidization activity by electrolyzing water by means of the electrolytic device to perform sterilization and disinfection, and may further heat a liquid to a required temperature by means of the heating member. The mounting device integrates the heating member and the electrolytic device together, to facilitate more compact structural arrangement of the heating member and the electrolytic device on one hand, and facilitate assembly/disassembly of the whole electrolytic assembly on the other hand, to facilitate updating and replacement of a product. In one embodiment, the electrolytic assembly applied to the laundry treatment apparatus is taken as an example, when an existing laundry treatment apparatus is provided with a heating member but is not provided with an electrolytic device, in case that the electrolytic device needs to be added for sterilization and disinfection to improve performance of the product, the existing heating member may be detached, then the electrolytic assembly provided by the disclosure may be mounted at an original position where the heating member is mounted, therefore the laundry treatment apparatus may be upgraded and replaced in case that other mounting structures of the laundry treatment apparatus are basically not changed, providing good interchangeability and low production cost.

DETAILED DESCRIPTION OF THE INVENTION

It should be noted that embodiments of the disclosure and features in the embodiments may be combined with each other without conflict, and detailed descriptions in a specific implementation should be understood as an explanation of embodiments of the disclosure and should not be taken as unduly limitations of the disclosure.

Figure 4:
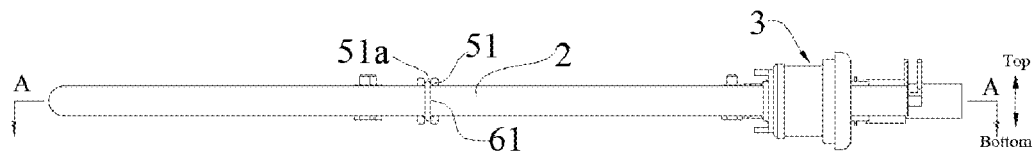
FIG. 4 illustrates a schematic diagram of the structure as shown in FIG. 2 from another perspective.
Figure 5:
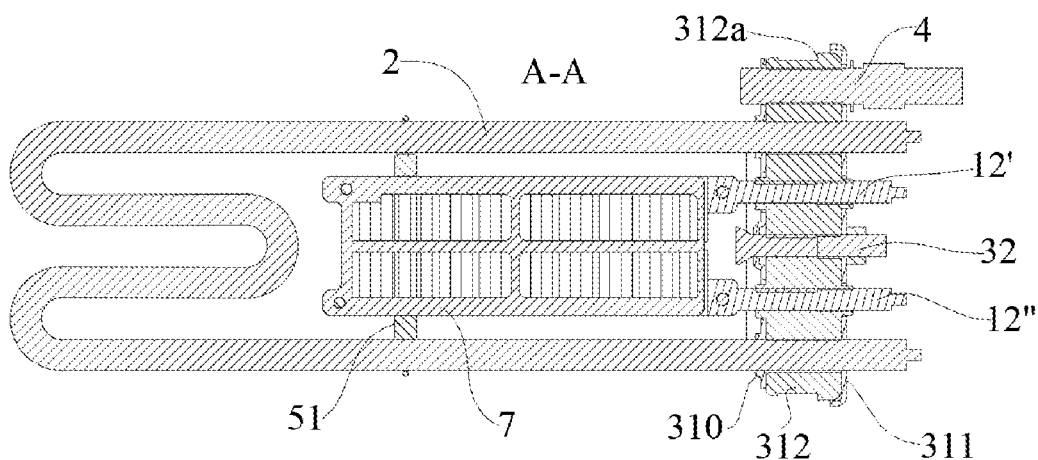
FIG. 5 illustrates a cross-sectional view along the A-A direction of FIG. 4.
Figure 6:
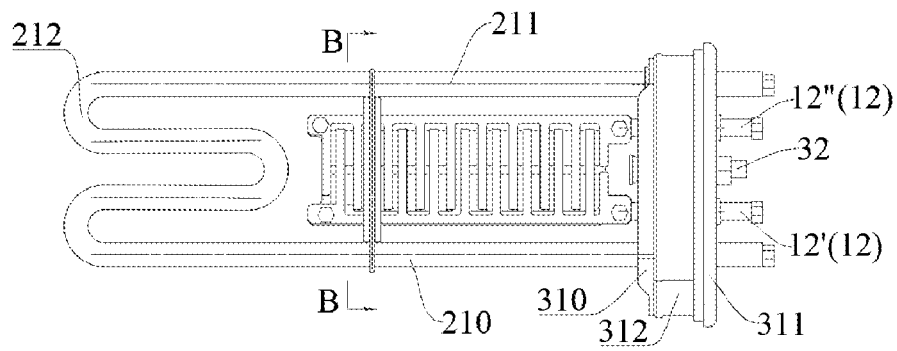
FIG. 6 illustrates a schematic diagram of the structure as shown in FIG. 1 from yet another perspective.
Figure 7:
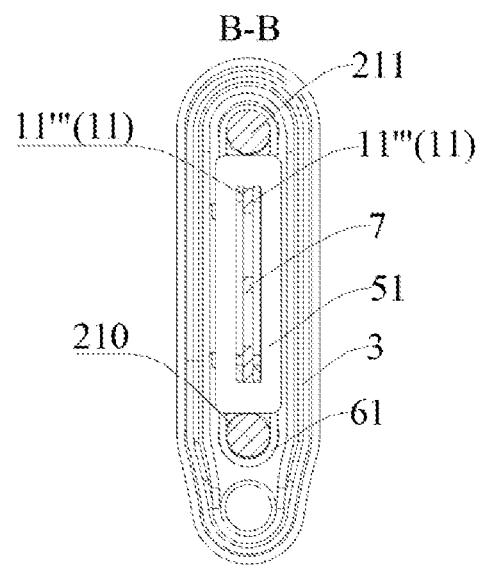
FIG. 7 illustrates a cross-sectional view along the B-B direction of FIG. 6.

During describing the disclosure, orientation or position relationships indicated by terms "top" and "bottom" are based on orientation or position relationships as shown in FIG. 4, and it should be understood that the orientation terms are intended only to conveniently describe the disclosure and simplify descriptions, rather than to indicate or imply that devices or components indicated by them must be in specific orientations or structured and operated in specific orientations, and thus should not be understood as limitations of the disclosure.

In the embodiments, a thickness direction of an electrode is consistent with a direction indicated by "top" and "bottom" shown in FIG. 4.

Figure 1:
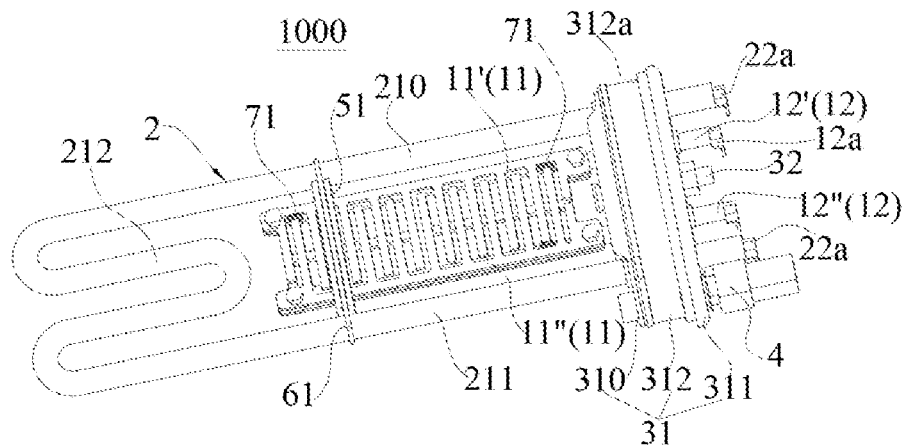
FIG. 1 illustrates a schematic structural diagram of an electrolytic assembly according to a first implementation of the disclosure, here the electrolytic assembly includes an electrode according to a first embodiment.
Figure 2:
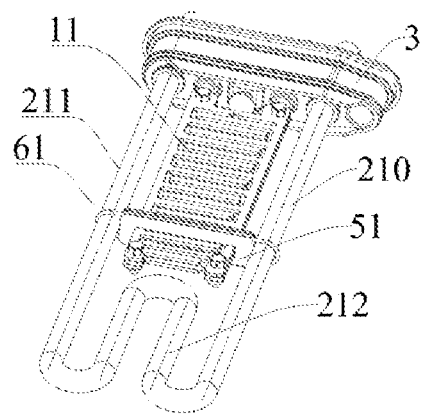
FIG. 2 illustrates a schematic diagram of the structure as shown in FIG. 1 from another perspective.

The embodiments of the disclosure provide an electrolytic assembly 1000, referring to FIGS. 1 and 2, the electrolytic assembly 1000 includes: an electrolytic device, including an electrode 11; a heating member 2; and a mounting device 3, to which at least one of the electrolytic device or the heating member 2 is connected, and the electrode 11 and the heating member 2 are located on the same side of the mounting device 3.

The electrolytic assembly 1000 according to the embodiments of the disclosure may generate .OH having a strong oxidization activity by electrolyzing water by means of the electrolytic device to perform sterilization and disinfection, and may further heat a liquid to a required temperature by means of the heating member 2. The mounting device 3 integrates the heating member 2 and the electrolytic device together, to facilitate more compact structural arrangement of the heating member 2 and the electrolytic device on one hand, and facilitate assembly/disassembly of the whole electrolytic assembly on the other hand, to facilitate updating and replacement of a product. In one embodiment, the electrolytic assembly 1000 applied to the laundry treatment apparatus is taken as an example, when an existing laundry treatment apparatus is provided with a heating member but is not provided with an electrolytic device, in case that the electrolytic device needs to be added for sterilization and disinfection to improve performance of the product, the existing heating member may be detached, then the electrolytic assembly 1000 provided by the disclosure may be mounted at an original position where the heating member is mounted, therefore the laundry treatment apparatus may be upgraded and replaced in case that other mounting structures of the laundry treatment apparatus are basically not changed, providing good interchangeability and low production cost.

There are many cases for at least one of the electrolytic device or the heating member 2 to be connected to the mounting device 3: in the first case, the electrolytic device is connected to the mounting device 3, and the heating member 2 is connected to the electrolytic device, that is, the heating member 2 is indirectly connected to the mounting device 3 through the electrolytic device; in the second case, the heating member 2 is connected to the mounting device 3, the heating member 2 is connected to the electrolytic device, and the electrolytic device is indirectly connected to the mounting device through the heating member 2; and in the third case, each of the electrolytic device and the heating member 2 is connected to the mounting device 3.

The electrode 11 and the heating member 2 are located on the same side of the mounting device 3, which means that most of the structure, with a heating function, of the heating member 2 and the electrode 11 are located on the same side of the mounting device 3.

In an embodiment, the electrolytic device includes a conductive connector 12 in conductive connection with the electrode 11, the mounting device 3 has formed therein a first mounting hole (not shown in the figure) penetrating it, and the conductive connector 12 is hermetically arranged in the first mounting hole in a penetrating manner, and water leakage may be avoided at the first mounting hole.

In an embodiment, the mounting device 3 has formed therein a second mounting hole (not shown in the figure) penetrating it, and an end of the heating member 2 is hermetically arranged in the second mounting hole in a penetrating manner, and water leakage may be avoided at the second mounting hole.

It may be understood that in an embodiment, only the first mounting hole as described above is formed in the mounting device 3, the second mounting hole is not formed; and in another embodiment, the mounting device 3 has both the first mounting hole and the second mounting hole, that is, each of the electrolytic device and the heating member 2 is connected to the mounting device 3.

It may be understood that the electrode 11 includes a cathode 11' and an anode 11", the conductive connector 12 includes a cathode conductive connector 12' in conductive connection with the cathode 11' and an anode conductive connector 12" in conductive connection with the anode 11", and the electrode 11 is connected with a power supply through the conductive connector 12. It may be understood that the cathode 11' and the anode 11" are spaced apart from each other, i.e., the cathode 11' and the anode 11" do not contact with each other at any position, and guaranteeing normal operation of the electrolytic device. It may be understood that referring to FIG. 28, in order to facilitate wiring of the conductive connector 12 to the power supply, a first terminal 12a may be fastened to an end of the conductive connector 12 by welding or the like, for example, the conductive connector 12 is fastened to the first terminal 12a after penetrating the first mounting hole.

The heating member 2 may be an electric heating tube, such as a glass heating tube, a stainless steel heating tube, a quartz heating tube, a ceramic heating tube or the like. The heating member 2 may be made into different shapes.

In an embodiment, referring to FIGS. 1-3 and FIG. 17, the heating member 2 includes a first rod 210, a second rod 211, and a transition body 212 connected between the first rod 210 and the second rod 211, a gap is formed between the first rod 210 and the second rod 211, the electrode 11 is located between the first rod 210 and the second rod 211, i.e., the electrode 11 is located in the gap, therefore on one hand, the first rod 210 and the second rod 211 may be kept at a distance from each other, and the heating area is increased, and on the other hand, an accommodating space may be provided for the electrode 11, and the electrolytic assembly 1000 may be more compact in structure.

The first rod 210, the second rod 211 and the transition body 212 may be integrally formed. The transition body 212 may be made in various desired shapes.

Figure 28:
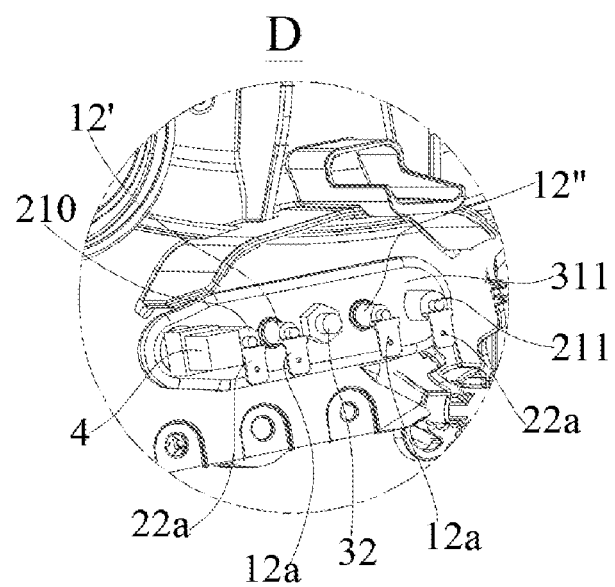
FIG. 28 illustrates a schematic enlarged diagram of part D in FIG. 27.

It may be understood that in order to facilitate wiring, referring to FIG. 28, a second terminal 22a may be fastened to an end of the heating member 2 by welding or the like. In one embodiment, an end of the heating member 2 is fastened to the second terminal 22a after penetrating the second mounting hole.

In some embodiments, the heating member 2 itself may have a temperature control function, for example, a bimetallic strip is placed in the heating tube, the bimetallic strip is formed by combining two metallic strips made of different materials together through a process according to embodiments of the disclosure, the bimetallic strip deforms according to temperature variations due to different expansion coefficients when the temperature changes, a contact switch is formed in the heating tube by using the bimetallic strip, and the contact switch may be automatically switched off to control the temperature after the temperature is reached.

In other embodiments, a temperature control structure may be additionally arranged outside of the heating member 2 to control the heating temperature. For example, in the embodiment of the disclosure, referring to FIGS. 1, 2 and 4, the electrolytic assembly 1000 includes a temperature controller 4, the mounting device 3 has formed therein a third mounting hole (not shown in the figure) penetrating it, the temperature controller 4 is hermetically arranged in the third mounting hole in a penetrating manner, and water leakage may be avoided at the third mounting hole, and an end, configured to measure temperature, of the temperature controller 4 is located on a side, facing the electrode, of the mounting device 3. The temperature controller 4 is also integrally mounted on the mounting device 3, to improve the integration level of the electrolytic assembly 1000 and reduce the mounting difficulty. The type of the temperature controller 4 is not limited.

The electrolytic assembly according to three specific implementations of the disclosure will be described below with reference to the drawings.

First Implementation

FIGS. 1-16 illustrate a schematic structural diagram of an electrolytic assembly according to a first implementation of the disclosure.

In an embodiment, the electrolytic assembly 1000 further includes a first fastener 61 connecting the electrode 11 to the heating member 2, and the first fastener 61 fixedly connects the electrode 11 to the heating member 2 to enhance a structural strength between the electrode 11 and the heating member 2. In one embodiment, the electrode 11 is mounted on the mounting device 3 through the conductive connector 12, the electrode 11 may be in a cantilever state, and force bearing condition of the electrode 11 may be improved through the first fastener 61 and the heating member 2, working life of the electrolytic assembly 1000 is prolonged, and working reliability of the electrolytic assembly 1000 is improved. The specific mechanism of the first fastener 61 is not limited.

Figure 10:
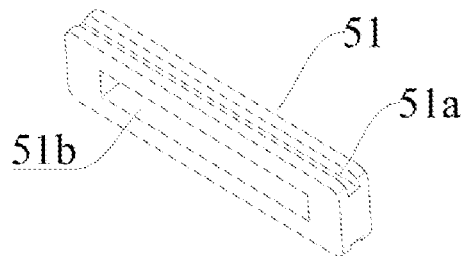
FIG. 10 illustrates a schematic structural diagram of a first insulator according to an embodiment of the disclosure.
Figure 12:
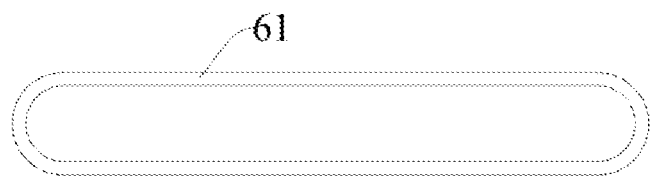
FIG. 12 illustrates a schematic structural diagram of a fastener according to an embodiment of the disclosure.

Furthermore, in order to prevent the electrode 11 from shaking under an external force to impact the heating member 2, in an embodiment, referring to FIG. 2, the electrolytic assembly 1000 includes a first insulator 51 and the first fastener 61, the first insulator 51 is arranged between the first rod 210 and the second rod 211, and referring to FIG. 10, a first through hole 51b is formed in the first insulator 51, the electrode 11 is arranged in the first through hole 51b in a penetrating mode, that is, the first insulator 51 is mounted to sleeve the electrode 11, therefore the electrode 11 may be electrically insulated from the first rod 210 and the second rod 211. Referring to FIG. 12, the first fastener 61 is approximately ring-shaped, and referring to FIG. 2, the first fastener 61 surrounds outer surfaces of the first rod 210, the second rod 211 and the first insulator 51. The electrode 11, the first rod 210 and the second rod 211 are bound together by the first fastener 61, and preventing the first insulator 51 from separating from the electrode 11 and the heating member 2.

The first insulator 51 may be made of a material having a damping property, such as rubber, silica gel or the like.

The first fastener 61 may be an iron wire, a strap or the like.

Figure 11:
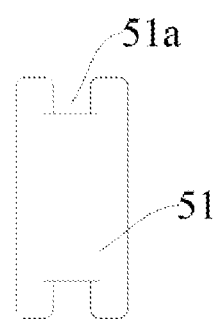
FIG. 11 illustrates a schematic diagram of the structure as shown in FIG. 10 from another perspective.

In order to facilitate limiting the position of the first fastener 61, in an embodiment, referring to FIGS. 10 and 11, at least one of a top surface or a bottom surface of the first insulator 51 is formed with a first groove 51a in which a part of the first fastener 61 is located, therefore the first groove 51a forms a limiting stop of the first fastener 61 to prevent the first fastener 61 from separating from the first insulator 51.

The structure of the electrode 11 is not limited.

The electrode 11 includes at least one layer of electrode units 11''', and each layer of electrode units 11''' includes a cathode sub-member 110 and an anode sub-member 111. For example, in an embodiment, when the electrode 11 includes multiple layers of electrode units 11''', referring to FIGS. 1 to 9, the cathode sub-members 110 in the multiple layers of electrode units 11' constitute the cathode 11' together, and the anode sub-members 111 in the multiple layers of electrode units 11' constitute the anode 11". In another embodiment, when the electrode 11 only includes one layer of electrode units 11''', referring to FIGS. 14 to 16, the cathode sub-member 110 is the cathode, and the anode sub-member 111 is the anode.

Figure 3:
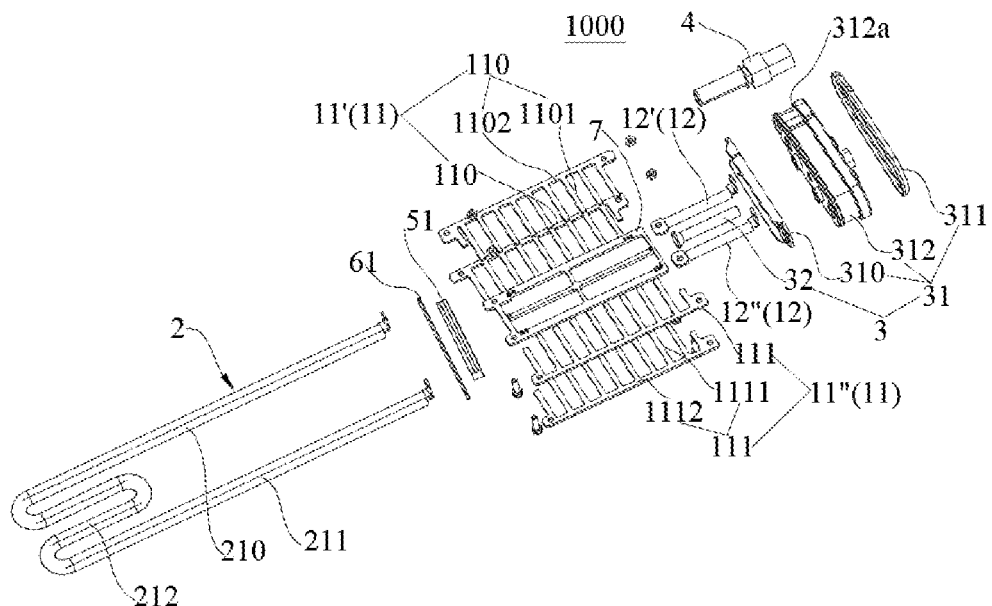
FIG. 3 illustrates a schematic exploded diagram of the structure as shown in FIG. 1.

In some embodiments, referring to FIG. 3, the cathode sub-member 110 includes a first support 1102 and at least one first comb-shaped tooth 1101 extending from the first support 1102 along a direction away from the first support 1102; and the anode sub-member 111 includes a second support 1112 and at least one second comb-shaped tooth 1111 extending from the second support 1112 along a direction away from the second support 1112; and the first comb-shaped tooth 1101 and the second comb-shaped tooth 1111 are alternately arranged at an interval, that is, the first comb-shaped tooth 1101 and the second comb-shaped tooth 1111 are formed in an interdigital structure.

According to the electrode device provided by the embodiment of the disclosure, the first comb-shaped tooth 1101 and the second comb-shaped tooth 1111 are formed in an interdigital structure, and on one hand, the electrode unit 11' has a larger working surface area, the electrolytic efficiency of the electrolytic device is improved, and on the other hand, the electrode unit 11' only needs to occupy a smaller space, therefore the electrolytic device may be compact in structure. In another embodiment, the electrolytic device applied to the laundry treatment apparatus is taken as an example, during washing laundries, fluffs on laundries are mixed into water, since a gap between the first comb-shaped tooth 1101 and the second comb-shaped tooth 1111 is a long and narrow gap, fluffs may easily pass through the long and narrow gap, that is, fluffs are not easy to block the electrolytic device, and the service life of the electrolytic device may be prolonged. In addition, when the electrolytic device bears an external force approximately perpendicular to the plane or curved surface, since the cathode sub-member 110 and the anode sub-member 111 do not overlap, the cathode sub-member 110 and the anode sub-member 111 do not contact with each other even if the cathode sub-member 110 and the anode sub-member 111 displace under an action of the external force, and thus a short circuit caused by contact between the cathode sub-member 110 and the anode sub-member 111 may be effectively prevented. According to this design, a thickness of the assembly of the cathode sub-member 110 and the anode sub-member 111 may be designed to be very small, which is beneficial for the light and thin design of the electrolytic device, and the electrolytic device may be installed in a narrow space, for example, between an inner cylinder and an outer cylinder of the laundry treatment apparatus.

It should be noted that in the laundry treatment apparatus, life of the electrolytic device needs to match with designed service life of the laundry treatment apparatus, and when the life of the electrolytic device is substantially shorter than the designed service life of the laundry treatment apparatus, the laundry treatment apparatus may be scrapped in advance and consumers' benefits are impaired. According to the electrolytic device provided by the embodiment of the disclosure, it may be guaranteed well that impurities such as fluffs or the like do not block the electrode 11, and thus the life of the electrolytic device may reach the designed service life of the laundry treatment apparatus.

The specific structural form of the first comb-shaped tooth 1101 is not limited, and the first comb-shaped tooth 1101 may be formed in a sheet shape, a column shape, a strip shape or the like. Similarly, the specific structural form of the second comb-shaped tooth 1111 is not limited, and the second comb-shaped tooth 1111 may be formed in a sheet shape, a column shape, a strip shape or the like. The cross section of the column shape is not limited in shape and may be circular, polygonal or the like.

In the embodiment of the disclosure, referring to FIG. 2, the structure of the first comb-shaped tooth 1101 is substantially the same as that of the second comb-shaped tooth 1111, the first comb-shaped tooth 1101 is substantially parallel to the second comb-shaped tooth 1111, and the first support 1102 is substantially parallel to the second support 1112, and the electrolytic device is more compact in structure and neat and attractive in appearance.

Figure 14:
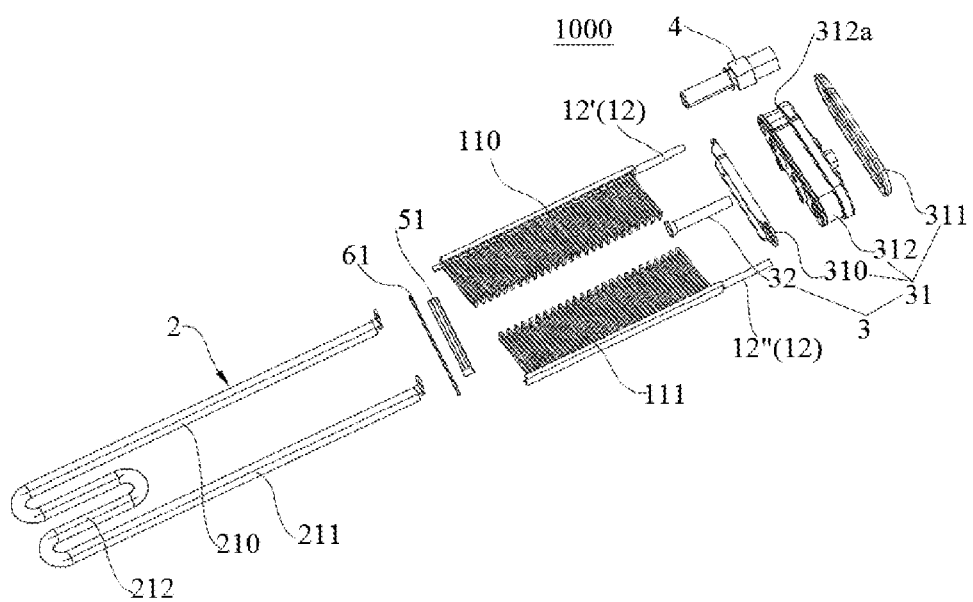
FIG. 14 illustrates a schematic structural diagram of an electrolytic assembly according to a first implementation of the disclosure, here the electrolytic assembly includes an electrode according to a second embodiment.
Figure 15:
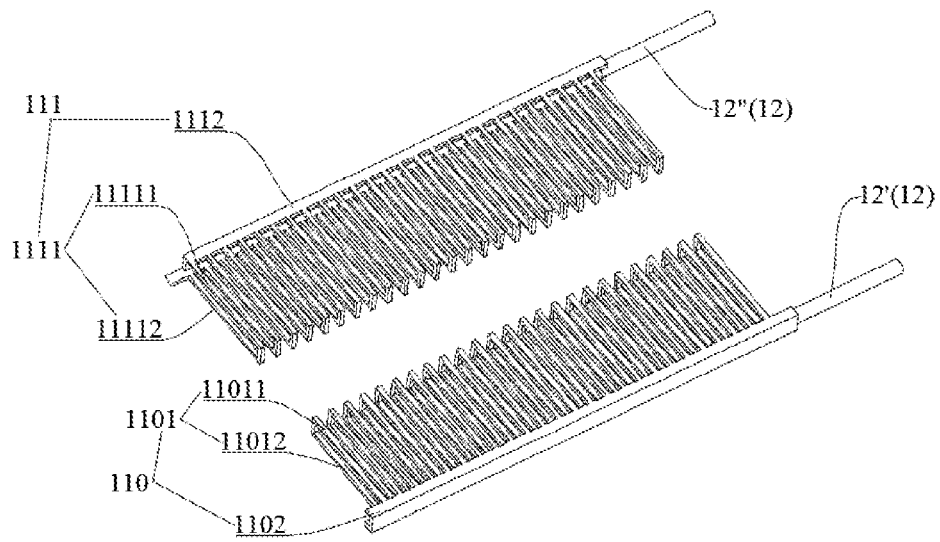
FIG. 15 illustrates a schematic exploded diagram of the electrode in FIG. 14.
Figure 16:
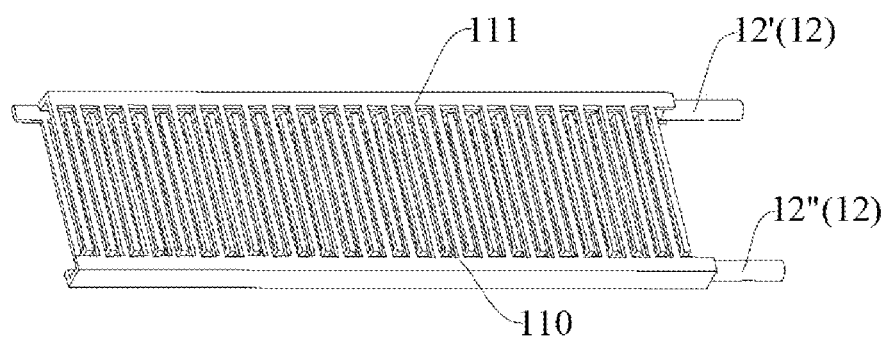
FIG. 16 illustrates a schematic assembling diagram of the structure as shown in FIG. 15.
Figure 17:
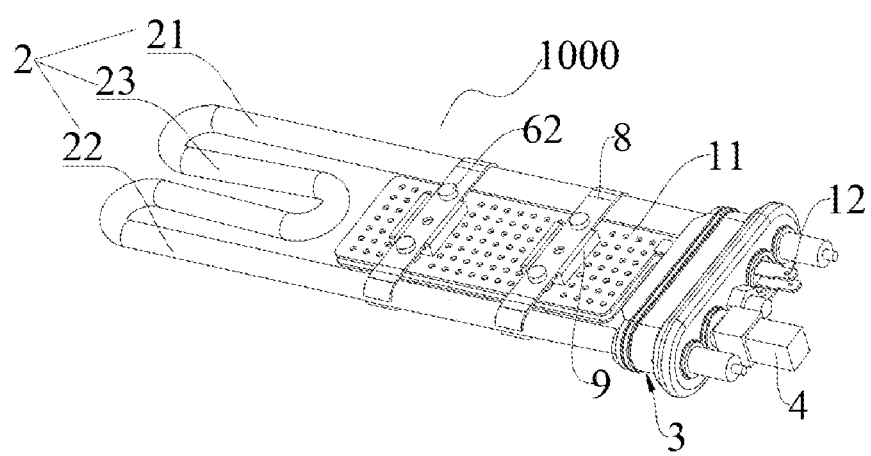
FIG. 17 illustrates a schematic structural diagram of an electrolytic assembly according to a second implementation of the disclosure.

In another embodiment, referring to FIGS. 14-16, the first comb-shaped tooth 1101 includes a first sub-tooth 11011 and a second sub-tooth 11012 which are arranged at an interval along a thickness direction of the cathode 11', that is, the first support 1102 has a thickness, and the first sub-tooth 11011 and the second sub-tooth 11012 share the same first support 1102; and the second comb-shaped tooth 1111 includes a third sub-tooth 11111 and a fourth sub-tooth 11112 which are arranged at an interval along a thickness direction of the anode 11'', that is, the second support 1112 has a thickness, and the third sub-tooth 11111 and the fourth sub-tooth 11112 share the same second support 1112. Thus, the electrolytic area may be increased, and the electrolytic efficiency may be improved.

Figure 9:
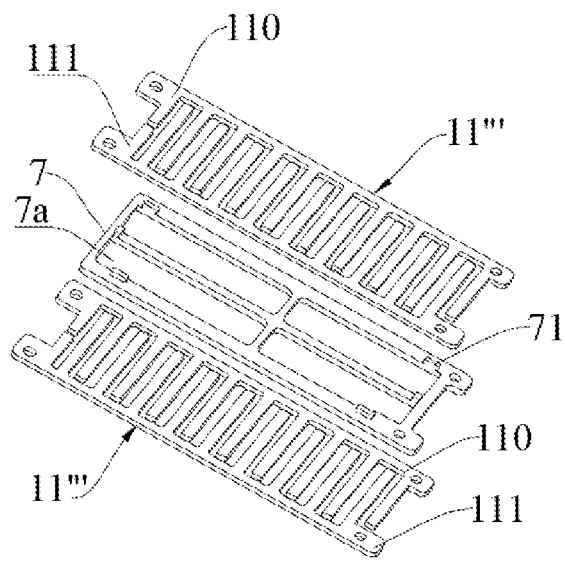
FIG. 9 illustrates an exploded diagram of the structure as shown in FIG. 8.

Referring to FIG. 9, the electrode units 11''' have multiple layers, the multiple layers of electrode units 11''' are stacked together to form the electrode 11, the cathode sub-members 110 of the multiple layers of electrode units 11''' may be fastened into a whole component through a fastener, and the anode sub-members 111 of the multiple layers of electrode units 11''' may be fastened into a whole component through a fastener. Furthermore, referring to FIG. 9, the electrolytic assembly 1000 includes separation pads 7 which are arranged between adjacent two of the electrode units 11'''. The number of the separation pads 7 depends on the number of the electrode units 11'''.

It should be noted that multiple cathode sub-members 110 are electrically connected to the cathode conductive connector 12', and multiple anode sub-members 111 are electrically connected to the anode conductive connector 12''. The cathode sub-members 110 and the cathode conductive connector 12' may be connected by welding, or may be connected by screws, bolts or the like. Similarly, the anode sub-members 111 and the anode conductive connector 12'' may be connected by welding, or may be connected by screws, bolts or the like.

Multiple electrode units 11''' are stacked to form the electrode 11, on one hand, the electrolytic area may be effectively increased, the electrolytic efficiency may be improved, and on the other hand, the manufacturing difficulty is reduced. In one embodiment, each of the electrode units 11''' is approximately formed in a flat structure, thus the structure is simple, machining and manufacturing cost thereof is low, manufacturing thereof is easy, standardized mass production thereof may be realized, and during assembly, the number of the electrode units 11''' to be stacked may be determined according to the needs of applications.

Figure 13:
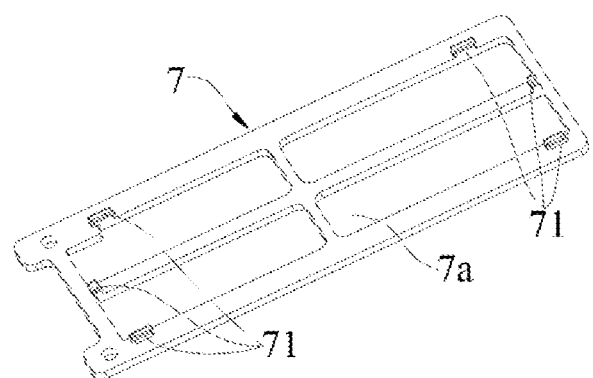
FIG. 13 illustrates a schematic structural diagram of a separation pad according to an embodiment of the disclosure.

Furthermore, in order to enhance fluidity of liquid around the electrode 11, and to facilitate that tiny bubbles on a surface of the electrode 11 to timely separate from the surface of the electrode 11 and diffuse into the liquid, in an embodiment, referring to FIG. 13, each of the separation pads 7 has formed therein first through holes 7a penetrating the separation pad 7 along a thickness direction thereof, and the liquid may flow among multiple electrode units 11''' and scour the surface of the electrode 11 to timely take away tiny bubbles on the surface of the electrode 11.

In an embodiment, with further reference to FIG. 13, a protrusion 71 is formed on a surface of each of the separation pads 7, and there may be one or more protrusions 71. The protrusion 71 extends into a space between the cathode sub-member 110 and the anode sub-member 111 of the electrode unit 11''' located on the same layer. The position of the protrusion 71 is not limited, for example, the protrusion 71 may extend into the gap between the first comb-shaped tooth 1101 and the second comb-shaped tooth 1111, therefore a short circuit caused by contact between the first comb-shaped tooth 1101 and the second comb-shaped tooth 1111 may be prevented; the protrusion 71 may also extend into a gap between an end of the first comb-shaped tooth 1101 and the second support 1112, and a short circuit caused by contact between the first comb-shaped tooth 1101 and the second support 1112 may be prevented; and the protrusion 71 may also extend into a gap between an end of the second comb-shaped tooth 1111 and the first support 1102, and a short circuit caused by contact between the second comb-shaped tooth 1111 and the first support 1102 may be prevented. In the case that there are multiple protrusions 71, it is also possible to arrange the protrusion 71 at each of the above positions.

Referring to FIGS. 1 and 2, in an embodiment, the mounting device 3 includes a connector 32 and a main body 31 has formed therein the first mounting hole, the second mounting hole, the third mounting hole and a connecting hole penetrating it, and each of the first mounting holes, the second mounting holes, the third mounting hole and the connecting hole penetrates from one side of the main body 31 to the other side of the main body 31. The connector 32 is hermetically arranged in the connecting hole in a penetrating manner.

It should be noted that in the implementation, there are two first mounting holes, the cathode conductive connector 12' is arranged in one of the first mounting holes in a penetrating manner, and the anode conductive connector 12" is arranged in the other of the first mounting holes in a penetrating manner. It should be noted that there are two second mounting holes, the first rod 210 is arranged in one of the second mounting holes in a penetrating manner, and the second rod 211 is arranged in the other of the second mounting holes in a penetrating manner.

Furthermore, referring to FIG. 3, the main body 31 includes a first mounting plate 310, a second mounting plate 311 and an elastic body 312. The first mounting plate 310 is arranged on a side, facing the electrode 11, of the elastic body 312, the second mounting plate 311 is arranged on a side, away from the electrode 11, of the elastic body 312, and the elastic body 312 is clamped between the first mounting plate 310 and the second mounting plate 311. The first mounting hole, the second mounting hole, the third mounting hole and the connecting hole penetrate the first mounting plate 310, the second mounting plate 311 and the elastic body 312 respectively.

In the embodiment of the disclosure, the connector 32 may be a connection structure formed by a bolt and a nut together.

The first mounting plate 310 and the second mounting plate 311 are tensioned through the connector 32, and the elastic body 312 deforms by bearing a force, an inner wall of the first mounting hole abuts against the conductive connector 12 in a sealing manner, an inner wall of the second mounting hole abuts against the heating member 2 in a sealing manner, and the connector 32 abuts against an inner wall of the connecting hole in a sealing manner.

In order to facilitate locating the elastic body 312 during assembly, in an embodiment, referring to FIGS. 1 and 4, an abutting surface 312a is formed along a circumferential direction of the elastic body 312.

Second Implementation

FIGS. 17-22 illustrate a schematic structural diagram of an electrolytic assembly according to a second implementation of the disclosure.

Figure 18:
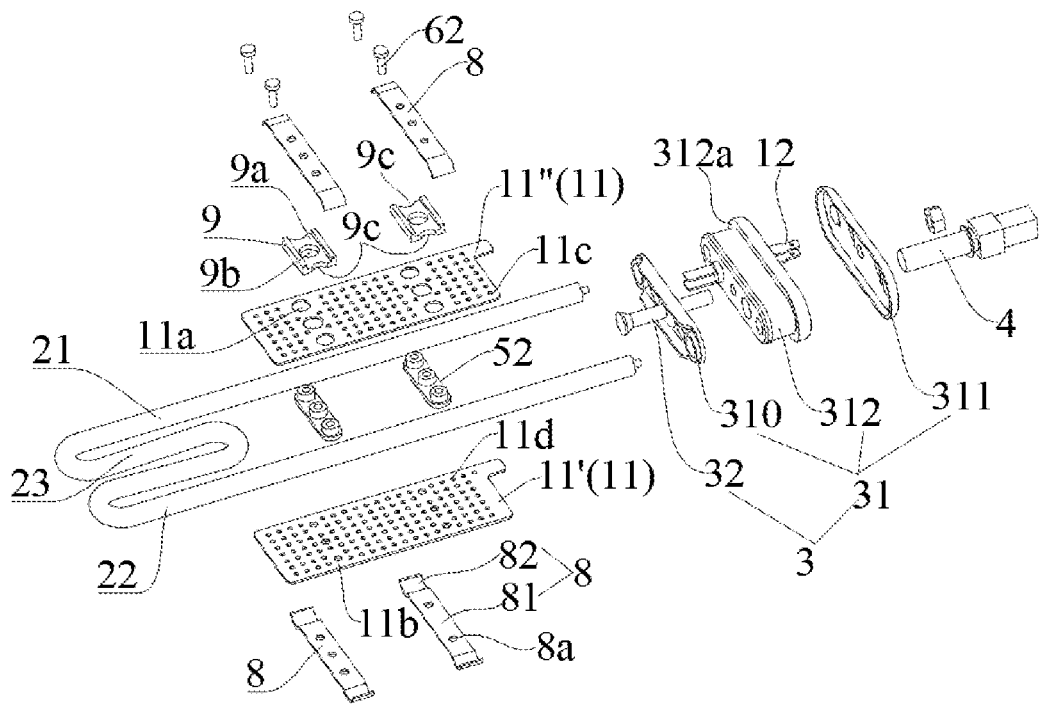
FIG. 18 illustrates a schematic exploded diagram of the structure as shown in FIG. 17.
Figure 19:
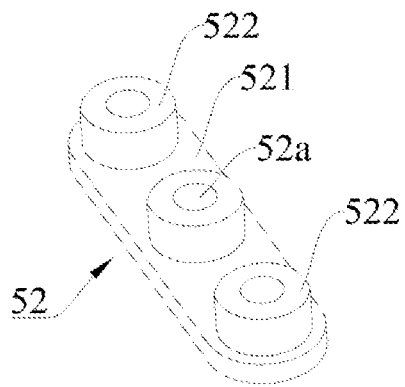
FIG. 19 illustrates a schematic structural diagram of a second insulator according to an embodiment of the disclosure.
Figure 20:
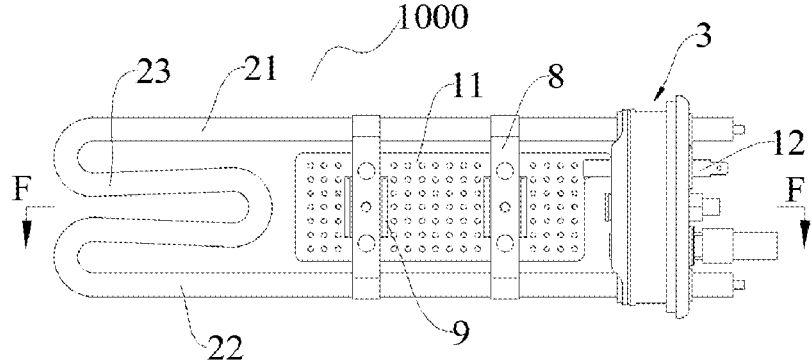
FIG. 20 illustrates a schematic diagram of the structure as shown in FIG. 17 from another perspective.
Figure 21:
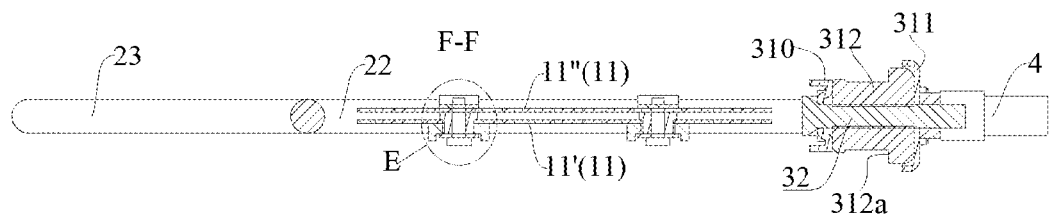
FIG. 21 illustrates a schematic diagram along the F-F direction of FIG. 20.

Referring to FIG. 18, the electrode 11 includes a cathode 11' and an anode 11", each of the cathode 11' and the anode 11" is formed in a plate shape, and the cathode 11' and the anode 11" are arranged in a stack. In an embodiment, the first rod 210 and the second rod 211 are arranged to be substantially parallel to each other, and a direction of stacking the cathode 11' and the anode 11" is perpendicular to a plane where the first rod 210 and the second rod 211 are located, and thus the electrolytic assembly 1000 is more compact in structure.

In an embodiment, with further reference to FIG. 18, the anode 11" is provided with second through holes 11c penetrating the anode 11" along a thickness direction thereof, and liquid flow may flow from one side of the anode 11" to the other side of the anode 11" through the second through holes 11c, and fluidity of water flow may be enhanced, and the water flow may take away microbubbles on the surface of the anode 11" in time to prevent the microbubbles from accumulating to become large. In an embodiment, with further reference to FIG. 18, the cathode 11' is provided with third through holes 11d penetrating the cathode 11' in a thickness direction thereof, and liquid flow may flow from one side of the cathode 11' to the other side of the cathode 11' through the third through holes 11d, and fluidity of water flow may be enhanced, and the water flow may take away microbubbles on the surface of the cathode 11' in time to prevent the microbubbles from accumulating to become large.

Figure 22:
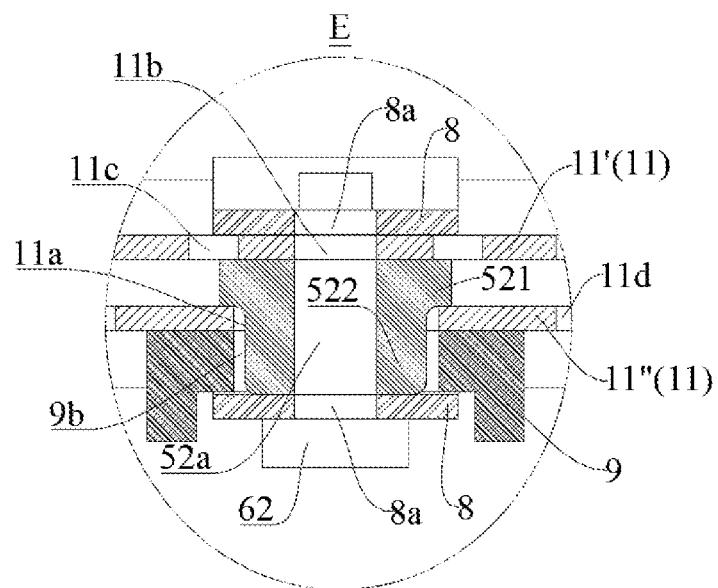
FIG. 22 illustrates a schematic enlarged diagram of part E in FIG. 21.

In an embodiment, referring to FIG. 18, the electrolytic assembly 1000 includes second insulators 52, and further referring to FIG. 22, at least a part of each of the second insulators 52 is clamped between the cathode 11' and the anode 11", and a short circuit caused by contact between the cathode 11' and the anode 11" may be avoided, and reliability of the electrolytic device is improved.

The shape of the second insulator 52 is not limited, as long as the cathode 11' and the anode 11" may be brought into contact effectively. For example, exemplarily, referring to FIG. 19, each of the second insulators 52 includes a base 521 and columns 522 protruding out of a surface of the base 521, and further referring to FIG. 22, the anode 11" is provided with through holes 11a, the base 522 is clamped between the cathode 11' and the anode 11", and each of the columns 522 is arranged in a respective one of the through holes 11a in a penetrating manner. According to the second insulator 52 of the embodiment, the cathode 11' and the anode 11" may be effectively isolated through the base 521, and the anode 11" may be located through the column 522.

There may be one or more columns 522.

The second insulator 52 may be made of a material having a damping property, such as rubber, silica gel or the like.

In an embodiment, referring to FIG. 18, the electrolytic assembly 1000 further includes a buckle 8 and second fasteners 62, and the buckle 8 and the electrode 11 are fixedly connected by the second fasteners 62 and the buckle 8. The electrode 11 may be attached to the heating member 2 through the second fasteners 62 and the buckle 8. In one embodiment, the electrode 11 is mounted on the mounting device 3 through the conductive connector 12, the electrode 11 may be in a cantilever state, and force bearing condition of the electrode 11 may be improved through the heating member 2 after attaching the electrode 11 to the heating member 2, working life of the electrolytic assembly 1000 may be prolonged, and working reliability of the electrolytic assembly 1000 may be improved.

Figure 8:
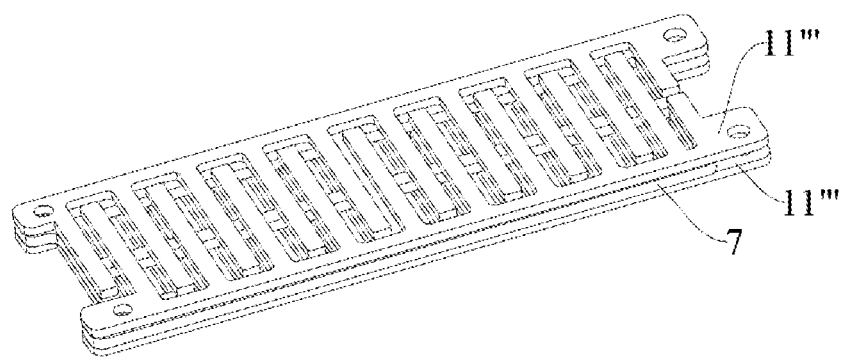
FIG. 8 illustrates a schematic structural diagram of the electrode in FIG. 1 assembling with a separation pad.

With further reference to FIG. 8, the buckle 8 includes a connecting section 81 located between the first rod 210 and the second rod 211 and snapping sections 82 located at two opposite ends of the connecting section 81, one of the snapping sections 82 is snapped on the first rod 210, snapped to a side, away from the second rod 211, of the first rod 210. The other of the snapping sections 82 is snapped on the second rod 211, snapped to a side, away from the first rod 210, of the second rod 211. The buckle 8 is snapped on the first rod 210 and the second rod 211 through the snapping sections 82 at two ends, and the buckle 8 is prevented from moving relative to the heating member 2.

The buckle 8 may be a metal member and the snapping sections 82 at two ends have greater structural strength and greater elastic deformation.

To enhance connection reliability, the buckle 8 as described above may be used in pairs. In one embodiment, the buckles 8 are arranged on two opposite sides along a stacking direction of the cathode 11' and the anode 11", the cathode 11' and the anode 11" are clamped between two of the buckles 8, and the two buckles 8 and the electrode 11 are fixedly connected through the second fasteners 62. In an embodiment, the second fastener 62 is a bolt which may securely lock the cathode 11' and the anode 11" between the two buckles 8.

In an embodiment, multiple buckles 8 are present, and arranged at intervals along a length direction of at least one of the first rod 210 or the second rod 211. It may be understood that multiple buckles 8 may be only present on a top side of the electrode; or multiple buckles 8 may be only present on a bottom side of the electrode; or multiple fasteners 8 may be present on both the top side and the bottom side of the electrode. That is, in the embodiment, multiple pairs of buckles 8 as described above are arranged at intervals along the length direction of at least one of the first rod 210 or the second rod 211, one pair of buckles includes one buckle on the top side of the electrode and one buckle on the bottom side of the electrode, and the two buckles are used in pair.

In an embodiment, an end face of each of the columns 522 protrudes out of a surface of the anode 11", and abuts against the connecting section 81 and an interval space is formed between the connecting section 81 and the anode 11", and the interval space may insulate and separate the connecting section and the anode 11" and electrochemical corrosion of the anode 11" may be prevented.

Furthermore, referring to FIG. 22, a first connecting hole 52a penetrating each of the columns 522 and the base 521 is formed in the second insulator 52, second connecting holes 8a are formed in the connecting section 81, third connecting holes 11b are formed in the cathode 11", and each of the second fasteners 62 is arranged in a respective one of the first connecting holes 52a, the second connecting holes 8a and the third connecting holes 11b in a penetrating manner, that is, the second fastener 62 does not contact with the anode 11", and electrochemical corrosion of the anode 11" may be prevented.

In an embodiment of the disclosure, the buckle 8 may be made of a metal. In one embodiment, in order to prevent the anode 11" from being in conductive contact with the heating member 2 or the second fastener 62, in an embodiment of the disclosure, the anode 11" is provided with a through hole 11a, the column 522 is arranged in the through hole 11a of the anode 11" in a penetrating manner, the anode 11" may be electrically insulated from the cathode 11', the buckle 8 and the second fastener 62 under an action of the second insulator 52, and electrochemical corrosion of the anode 11" may be prevented.

In an embodiment, referring to FIG. 18, the electrolytic assembly 1000 further includes insulated limiting members 9 clamped in the interval space between the connecting section 81 and the anode 11", and to limit the electrode 11 to prevent the electrode 11 from moving in the stacking direction.

In an embodiment, referring to FIGS. 18 and 22, at least one second through hole 9b is formed in each of the insulated limiting members 9, and each of the columns 522 is arranged in a respective one of the second through holes 9b in a penetrating mode. A locating effect may be achieved on insulated limiting member 9 through the column 522, and the insulated limiting member 9 may be rapidly located and mounted during assembly.

The number of the column 522 is greater than or equal to that of the second through hole 9b. In an embodiment, multiple columns 522 are present, and arranged at intervals along an extending direction of the connecting section 81. There may be one or more second through holes 9b in the insulated limiting member 9, and when there are multiple second through holes 9b, a respective one column 522 is arranged in each of the second through holes 9b in a penetrating mode. It may be understood that when multiple columns 522 are arranged, there may be one or more second fasteners 62, that is, when at least one second fastener 62 meets a need for a fixed connection, no second fasteners 62 may be placed in some columns 522.

In another embodiment, referring to FIG. 18, each of the insulated limiting members 9 has formed therein a second through hole 9b in which a respective one of the columns 522 is arranged in a penetrating manner, one of the insulated limiting members 9 is arranged between two of the columns 522, that is, there are at least three columns 522, and each of the insulated limiting members 9 is formed with open notches 9c at two opposite ends thereof along the extending direction of the connecting section 81, and each of the open notches 9c is matched with the corresponding column 522. Through the open notches 9c at two ends, the insulated limiting member 9 may be well located, and thus the insulated limiting member 9 is prevented from rotating. In the embodiment, a size of the insulated limiting member 9 may be reduced, and the electrolytic assembly is simple in structure.

In an embodiment, with further reference to FIG. 18, each of the insulated limiting members 9 is provided with a second groove 9a extending along an extending direction of the connecting section 81, and a part of the connecting section 81 is located in the second groove 9a. The second groove 9a plays a role of locating the connecting section 81 in a direction perpendicular to the extending direction of the connecting section 81, and thus the connecting section 81 is prevented from sliding relative to the insulated limiting member 9.

In the implementation, the structure of the mounting device is substantially the same as that in the first implementation, except that in the implementation, there is one first mounting hole, and the conductive connector of the anode and the conductive connector of the cathode share the one first mounting hole. It should be noted that the conductive connector of the cathode and the conductive connector of the anode remain electrically insulated even if they are arranged in the same first mounting hole.

Third Implementation

Figure 23:
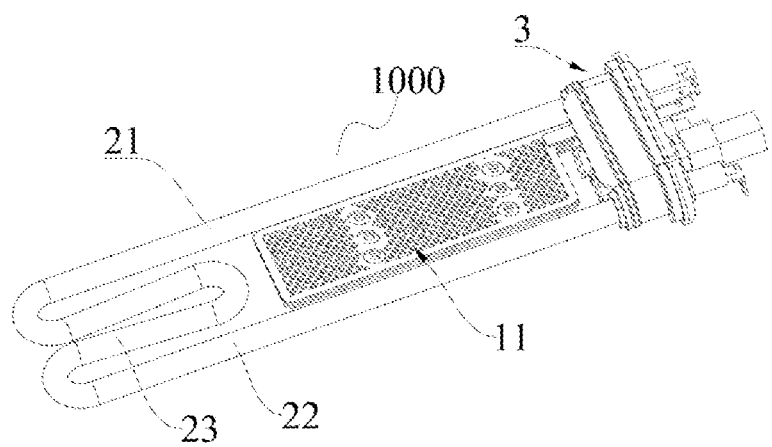
FIG. 23 illustrates a schematic structural diagram of an electrolytic assembly according to a third implementation of the disclosure, here a buckle, an insulated limiting member and a second fastener are omitted.
Figure 24:
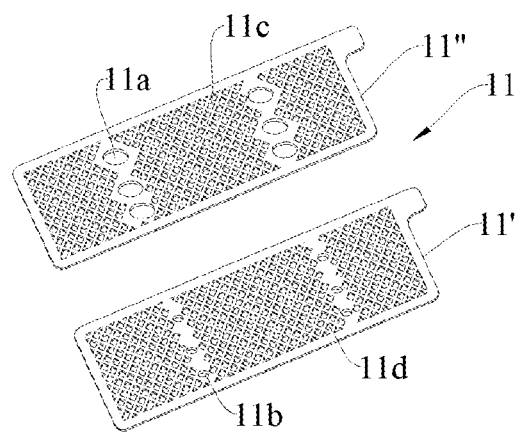
FIG. 24 illustrates a schematic structural diagram of an electrode in the structure as shown in FIG. 23.
Figure 25:
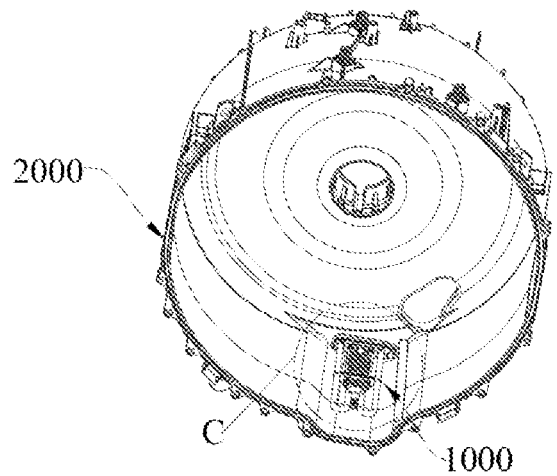
FIG. 25 illustrates part of a schematic structural diagram of a laundry treatment apparatus according to an embodiment of the disclosure, here the laundry treatment apparatus is provided with the electrolytic assembly according to the first implementation.

Referring to FIGS. 23 and 24, the structure in the implementation is substantially the same as that in the second implementation, except that the structural form of the electrode is different. In one embodiment, referring to FIG. 24, in the implementation, each of the cathode 11' and the anode 11" is formed in a net-shaped structure, that is, density of the third through holes 11d in the cathode 11' is large and the cathode 11' is formed in a net-shaped structure as a whole, and density of the second through holes 11c in the anode 11" is large and the anode 11" is in is formed in a net-shaped structure as a whole.

Referring to FIGS. 25-28, embodiments of the disclosure provides a laundry treatment apparatus including an inner cylinder (not shown in the figure), an outer cylinder 2000, and the electrolytic assembly 1000 of any one of the above descriptions, here the inner cylinder is arranged in a rotatable manner in the outer cylinder 2000, and the outer cylinder 2000 has formed therein an avoiding opening (not shown in the figure), and the electrode 11 and the heating member 2 are arranged between the outer cylinder 2000 and the inner cylinder, and the mounting device 3 seals the avoiding opening.

According to the laundry treatment device disclosed by the embodiment of the disclosure, during working, when the outer cylinder is filled with water, the electrolytic device is activated and may generate hydroxyl free radicals (.OH) with a strong oxidation activity, .OH has an extremely high oxidation potential (2.80 eV) and extremely strong oxidation capacity, may generate a rapid chain reaction with most of organic pollutants, may realize sterilization and disinfection at a low temperature and does not damage laundries, a part of .OH react with chlorine water in tap water to generate active chlorine, and the active chlorine may exist for a long time and has a long-term bacteriostatic effect; and the electrolytic device generates a large amount of .OH to oxidize and destroy chromophoric groups of dye molecules of colored laundries dissociated into water during washing to decolorize dyes, and the dissociated dyes are prevented from staining light-color laundries to induce cross-color, and the dye molecules are decomposed into harmless carbon dioxide, water and inorganic salt through continuous reaction. Furthermore, a large number of hydrogen microbubbles may be generated by the electrode 11, since a diameter of each of the microbubbles is small, generally smaller than 50 um, the microbubbles may well enter an interior of laundry fibers during washing, circulating flushing of the microbubbles is continuously generated through blasting, adsorption and floating effects of the microbubbles, to assist a detergent to thoroughly remove sebum, grease, tiny dust and other dirt accumulated in the laundry fibers, and thus the washing effect may be improved.

It should be noted that the laundry treatment apparatus according to the embodiment of the disclosure may be a washing machine, a dewatering machine, or another type of apparatus, no limitation is made thereto. It may be understood that the washing machine may be a pulsator washing machine, or may be a drum washing machine, or may be a washing machine of another structural type.

Figure 26:
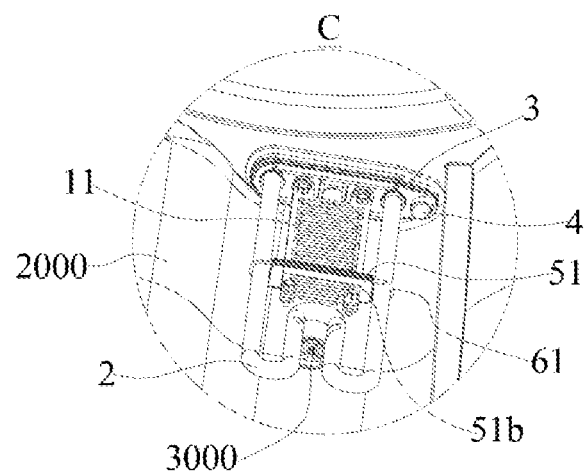
FIG. 26 illustrates a schematic enlarged diagram of part C in FIG. 24.
Figure 27:
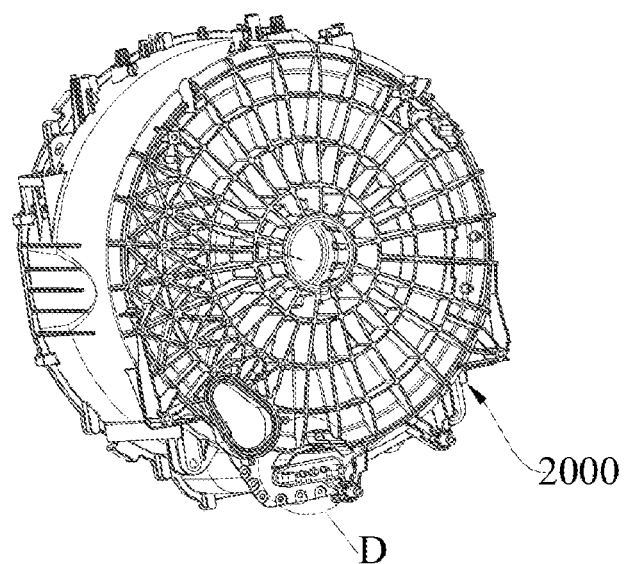
FIG. 27 illustrates a schematic diagram of the structure as shown in FIG. 24 from another perspective.

In order to facilitate the support of the heating member 2, in an embodiment of the disclosure, referring to FIG. 26, the laundry treatment apparatus includes a mounting support 3000 connected to an inner side of the outer cylinder 2000 and supporting the heating member 2. The mounting support 3000 plays a supporting role on the heating member 2, the mounting support 3000 and the mounting device 3 support the heating member 2 together, and the support of the heating member 2 is avoided to become a cantilever, and force bearing condition of the heating member 2 may be improved. The mounting support 3000 may be any suitable structure.

The assembly of the electrolytic assembly 1000 and the outer cylinder 2000 according to a specific embodiment of the disclosure will be described below by example of the laundry treatment apparatus being a drum washing machine. An axial side of the outer cylinder 2000 is provided with an opening, and the other side, opposite to the opening, of the outer cylinder is a closed end. The embodiment of the disclosure is described by example of the avoiding opening being formed at the closed end, and it may be understood that the avoiding opening may also be formed in the circumference, following the rotation direction, of the outer cylinder 2000.

Before assembly, the heating member 2, the mounting device 3 and the electrolytic device may form an integral structure in advance, and during assembly, the integral structure is placed into the avoiding opening from the outer side of the outer cylinder 2000, the elastic body 312 abuts against the periphery of the avoiding opening in a sealing manner, the electrolytic assembly is pushed inwards until the abutting face 312a of the elastic body 312 abuts against the outer surface of the outer cylinder, therefore, rapid and accurate locating of the electrolytic assembly is facilitated. And then, the connector 32 is tensioned, the elastic body 312 generates elastic deformation, the parts, located around the avoiding opening in the inner side of the outer cylinder and around the avoiding opening in the outer side of the outer cylinder, of the elastic body 312 are bulged towards the periphery, then the elastic body 312 is clamped on the outer cylinder from both the inner direction and the outer direction, and quick sealed mounting may be realized simply and conveniently.

In the embodiment, a modular assembly is adopted, and thus the assembly is simple and efficient.

The embodiments/implementations provided in the disclosure may be combined with each other without conflict.

What is claimed is:

1. An electrolytic assembly, comprising:
an electrolytic device, comprising an electrode;
a heating member, the heating member comprising a first rod and a second rod connected with each other and forming there-between a gap where the electrode is located; and
buckles and second fasteners, wherein the heating member and the electrode are fixedly connected through the second fasteners;
wherein the electrode comprises a cathode and an anode, the electrolytic assembly comprises second insulators, each of which at least a part is clamped between the cathode and the anode;
wherein the cathode and the anode are arranged in a stack, each of the second insulators comprises a base clamped between the cathode and the anode and columns protruding out of a surface of the base, the anode is provided with through holes, and each of the columns is arranged in a respective one of the through holes in a penetrating manner.

2. The electrolytic assembly of claim 1, wherein the heating member comprises a transition body connecting the first rod to the second rod, and the first rod, the second rod and the transition body are integrally formed.

3. The electrolytic assembly of claim 1, wherein each of the buckles comprises a connecting section located between the first rod and the second rod and snapping sections located at two opposite ends of the connecting section, a first of the snapping sections is snapped on the first rod, and a second of the snapping sections is snapped on the second rod.

4. The electrolytic assembly of claim 1, wherein a plurality of buckles are present, and arranged at intervals along a length direction of at least one of the first rod or the second rod.

5. The electrolytic assembly of claim 1, wherein the buckles are arranged on two opposite sides along a stacking direction of the cathode and the anode, the cathode and the anode are clamped between two of the buckles, and the cathode, the anode and the two of the buckles are fixedly connected through the second fasteners.

6. The electrolytic assembly of claim 3, wherein an end face of each of the columns protrudes out of a surface of the anode, and abuts against one connecting section, wherein an interval space is formed between the connecting section and the anode, a first connecting hole penetrating each of the columns and each of the bases is formed in each of the second insulators, second connecting holes are formed in the connecting section, third connecting holes are formed in the cathode, and each of the second fasteners is arranged in a respective one of the first connecting holes, the second connecting holes and the third connecting holes in a penetrating manner.

7. The electrolytic assembly of claim 6, comprising insulated limiting members clamped in the interval space between the connecting section and the anode, wherein at least one second through hole is formed in each of the insulated limiting members.

8. The electrolytic assembly of claim 7, wherein each of the columns is arranged in a respective one of the at least one second through hole in a penetrating manner.

9. The electrolytic assembly of claim 7, wherein a plurality of columns are present, and arranged at intervals along an extending direction of one connecting section, one of the columns is arranged in a respective one of the at least one second through holes in a penetrating manner, each of the insulated limiting members is formed with open notches at two opposite ends thereof along the extending direction of the connecting section, and each of the open notches is matched with a respective one of the columns.

10. The electrolytic assembly of claim 7, wherein each of the insulated limiting members is provided with a second groove extending along an extending direction of the respective connecting section, and a part of the connecting section is located in the respective second groove.

11. A laundry treatment apparatus, comprising:
an inner cylinder;
an outer cylinder, in which the inner cylinder is rotatably arranged, and having formed therein an avoiding opening; and
the electrolytic assembly of claim 1, having the electrode and the heating member arranged between the outer cylinder and the inner cylinder, and having a mounting device sealing the avoiding opening.

* * * * *